United States Patent
Kawamoto et al.

(10) Patent No.: US 11,982,010 B2
(45) Date of Patent: May 14, 2024

(54) NI-PLATED STEEL SHEET AND MANUFACTURING METHOD THEREOF

(71) Applicant: NIPPON STEEL CORPORATION, Tokyo (JP)

(72) Inventors: Kosuke Kawamoto, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/801,255

(22) PCT Filed: Mar. 1, 2021

(86) PCT No.: PCT/JP2021/007709
§ 371 (c)(1),
(2) Date: Aug. 21, 2022

(87) PCT Pub. No.: WO2021/177231
PCT Pub. Date: Sep. 10, 2021

(65) Prior Publication Data
US 2023/0105625 A1  Apr. 6, 2023

(30) Foreign Application Priority Data
Mar. 3, 2020 (JP) .................. 2020-035832

(51) Int. Cl.
| | |
|---|---|
| *C25D 3/56* | (2006.01) |
| *B32B 15/01* | (2006.01) |
| *C21D 6/00* | (2006.01) |
| *C21D 9/46* | (2006.01) |

(Continued)

(52) U.S. Cl.
CPC ............ *C25D 3/562* (2013.01); *B32B 15/015* (2013.01); *C21D 6/005* (2013.01); *C21D 9/46* (2013.01); *C22C 19/03* (2013.01); *C25D 5/50* (2013.01); *Y10T 428/12937* (2015.01); *Y10T 428/12944* (2015.01); *Y10T 428/12951* (2015.01)

(58) Field of Classification Search
None
See application file for complete search history.

(56) References Cited

U.S. PATENT DOCUMENTS

2018/0351138 A1* 12/2018 Asada .................. B32B 15/04
2020/0331050 A1* 10/2020 Yang ..................... C25D 3/565

FOREIGN PATENT DOCUMENTS

| JP | 05025600 A | * | 2/1993 |
| JP | 2011-222125 A | | 11/2011 |
| WO | 2019071346 A1 | | 4/2019 |

* cited by examiner

*Primary Examiner* — Xiaobei Wang
(74) *Attorney, Agent, or Firm* — Renner, Otto, Boisselle & Sklar, LLP

(57) ABSTRACT

A Ni-plated steel sheet according to one aspect of the present invention includes a base steel sheet and a Ni plating layer provided on a surface of the base steel sheet, the Ni plating layer has a Ni—Fe alloy layer formed on a surface of the base steel sheet, and a ratio of a Zn content to a Ni content in the Ni plating layer is 0.0005% to 0.10%. A manufacturing method of the Ni-plated steel sheet according to one aspect of the present invention has electroplating a base steel sheet using a Ni plating bath in which $[Zn^{2+}]/[Ni^{2+}]$ is set to 0.0005% to 0.10% to obtain a material Ni-plated steel sheet, and annealing the material Ni-plated steel sheet.

8 Claims, 2 Drawing Sheets

(51) Int. Cl.
*C22C 19/03* (2006.01)
*C25D 5/50* (2006.01)

NI-PLATED STEEL SHEET AND MANUFACTURING METHOD THEREOF

TECHNICAL FIELD OF THE INVENTION

The present invention relates to a Ni-plated steel sheet and a manufacturing method thereof.

Priority is claimed on Japanese Patent Application No. 2020-035832, filed in Japan on Mar. 3, 2020, the content of which is incorporated herein by reference.

RELATED ART

Conventionally, Ni-plated steel sheets have been used as surface-treated steel sheets for battery containers. Due to the excellent chemical stability of Ni, Ni-plated steel sheets are used for a variety of battery containers such as battery cans and the like for, for example, alkaline manganese dry batteries, lithium ion batteries, and nickel-hydrogen batteries. In recent years, Ni-plated steel sheets having high corrosion resistance have been highly expected. For example, as battery can applications, with the expansion of fields where batteries are used, a demand for corrosion resistance that is required for battery cans is further intensifying.

As means for enhancing the corrosion resistance of Ni-plated steel sheets, for example, Patent Document 1 discloses a Ni-plated steel sheet having excellent pitting corrosion resistance, in which a Ni plating layer in which Ni coating weight (A) is 5 g/m² or more and 60 g/m² or less is formed on at least one surface of the steel sheet, at least a part of the Ni plating layer forms a base metal and a Fe—Ni diffusion layer, a Zn—Ni alloy plating layer is provided on the Ni plating layer, Zn—Ni coating weight (B) is 1 g/m² or more and 20 g/m² or less, and a ratio of the Ni coating weight (A) to the Zn—Ni coating weight (B), A/B ratio, is at least 2. In the technique described in Patent Document 1, the corrosion resistance is enhanced using the Zn—Ni alloy plating layer in which Ni % is 5 to 20 mass %. Such a Zn—Ni alloy plating layer is considered to have a high sacrificial protection capability.

Incidentally, nowadays, electrolytic solution resistance in demand has been gradually becoming more favorable. In the technique disclosed in Patent Document 1, Zn having a lower ionization tendency than the steel sheet, which is the base material metal, is preferentially corroded, thereby preventing the progress of corrosion of the steel sheet. Therefore, with the steel sheet disclosed in Patent Document 1, elution of Zn cannot be avoided, and there is room for improvement from the viewpoint of electrolytic solution resistance.

PRIOR ART DOCUMENT

Patent Document

[Patent Document 1] Japanese Unexamined Patent Application, First Publication No. 2011-222125

DISCLOSURE OF THE INVENTION

Problems to be Solved by the Invention

An object of the present invention is to provide a Ni-plated steel sheet having excellent electrolytic solution resistance and corrosion resistance and a manufacturing method thereof.

Means for Solving the Problem

The gist of the present invention is as described below.

(1) A Ni-plated steel sheet according to one aspect of the present invention includes a base steel sheet and a Ni plating layer provided on a surface of the base steel sheet, the Ni plating layer includes a Ni—Fe alloy layer formed on the surface of the base steel sheet, and a ratio of a Zn content to a Ni content in the Ni plating layer is 0.0005% to 0.10%.

(2) In the Ni-plated steel sheet according to (1) above, the Ni—Fe alloy layer may be formed in a part of the Ni plating layer.

(3) In the Ni-plated steel sheet according to (1) above, the Ni—Fe alloy layer may be formed up to an outermost surface of the Ni plating layer.

(4) In the Ni-plated steel sheet according to any one of (1) to (3) above, a Ni coating weight per one surface may be 2.7 to 32.8 g/m².

(5) A manufacturing method of a Ni-plated steel sheet according to another aspect of the present invention is a manufacturing method of the Ni-plated steel sheet according to any one of (1) to (4) above, including electroplating a base steel sheet using a Ni plating bath in which $[Zn^{2+}]/[Ni^{2+}]$ is set to 0.0005% to 0.10% to obtain a material Ni-plated steel sheet, and annealing the material Ni-plated steel sheet.

(6) In the manufacturing method of the Ni-plated steel sheet according to (5) above, a current density in the electroplating may be set to 100 to 5000 A/m².

(7) In the manufacturing method of the Ni-plated steel sheet according to (5) or (6) above, a Ni coating weight per one surface in the material Ni-plated steel sheet may be set to 2.7 to 32.8 g/m².

Effects of the Invention

According to the present invention, it is possible to provide a Ni-plated steel sheet having excellent electrolytic solution resistance and corrosion resistance and a manufacturing method thereof.

BRIEF DESCRIPTION OF THE DRAWINGS

FIG. 1-2 is a conceptual diagram of a Ni-plated steel sheet according to the present embodiment, which has a total diffusion layer.

EMBODIMENTS OF THE INVENTION

The present inventors intensively studied means for improving both the electrolytic solution resistance and the corrosion resistance of a Ni-plated steel sheet. As a result, the present inventors found that it is effective to add an extremely small amount of Zn to a Ni plating layer of the Ni-plated steel sheet. Specifically, it was found that, when the ratio of the Zn content to the Ni content in the Ni plating layer is set within a range of 0.0005% to 0.10%, the corrosion resistance can be dramatically improved while maintaining the electrolytic solution resistance.

It is known that Zn has an effect on improvement in corrosion resistance by sacrificial protection. However, it has been considered that, in order to exhibit the sacrificial protection effect of Zn, it is necessary to set the Zn content on the outermost surface of a material to several tens of mass % or more. For example, in Patent Document 1, in the Zn-alloy plating layer that is disposed on the outermost surface, the Ni content is set to 5 to 20 mass % (that is, the Zn content is 80 mass % or more).

On the other hand, the present inventors found that, contrary to expectations based on the prior art, an extremely small amount of Zn that is contained in the Ni plating layer dramatically enhances the corrosion resistance of the Ni plating layer. Furthermore, it was also clarified that, when the ratio of the Zn content to the Ni content in the Ni plating layer is set to 0.10% or less, it is possible to ensure the same level of electrolytic solution resistance as that of normal Ni-plated steel sheets.

Figure 1:
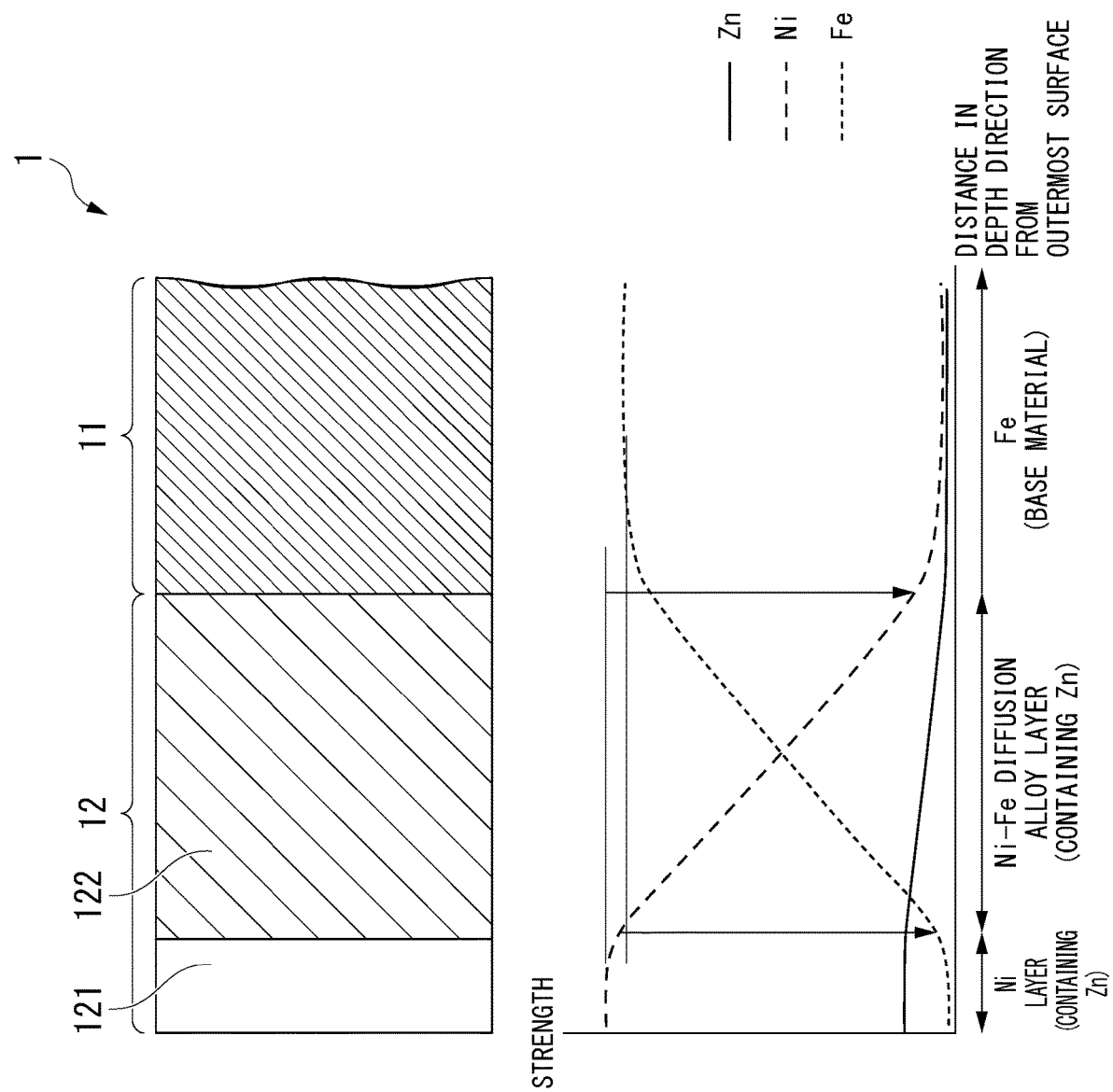
FIG. 1-1 is a conceptual diagram of a Ni-plated steel sheet according to the present embodiment, which has a partial diffusion layer.
Figures 1, 2:
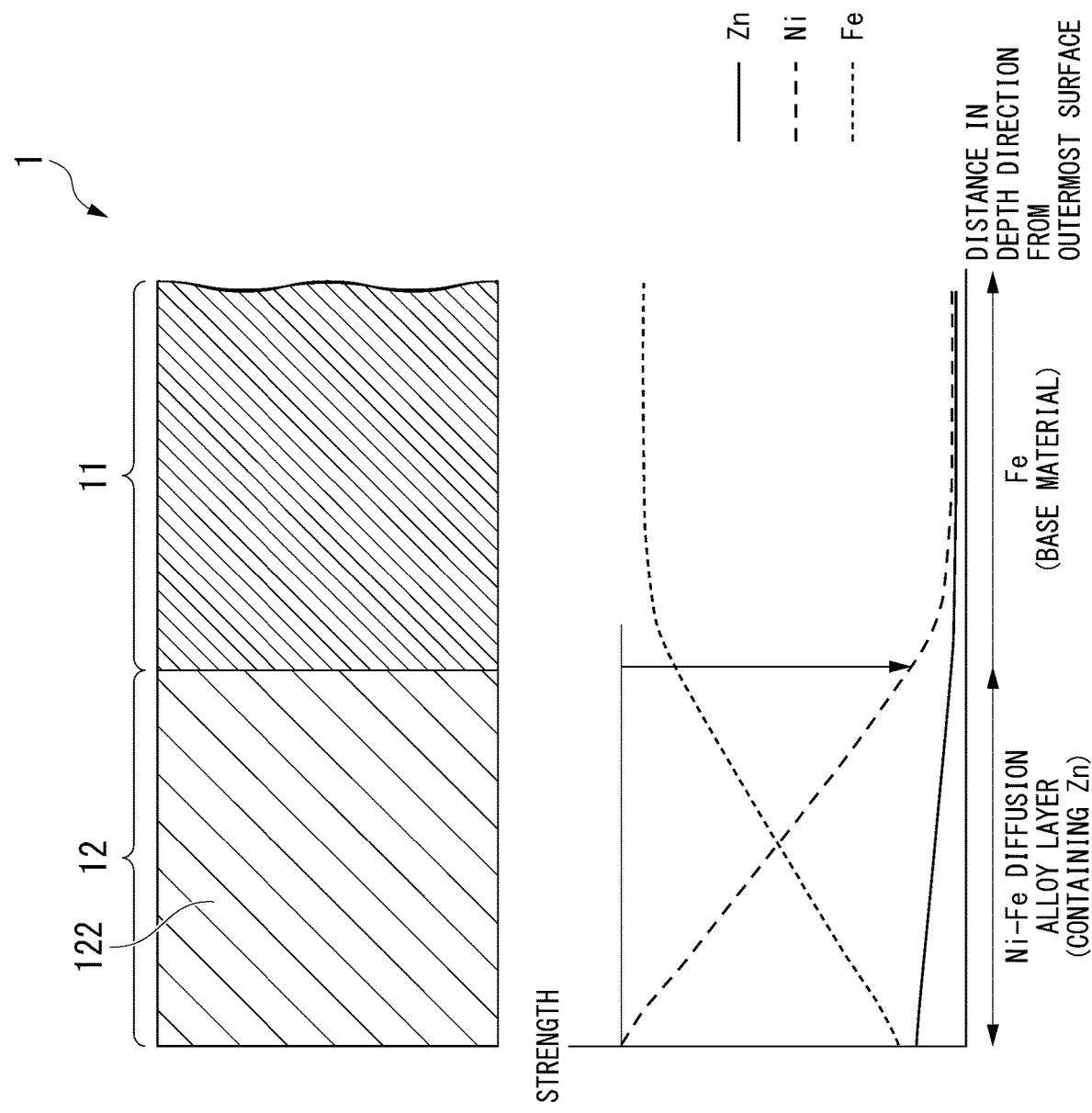

A Ni-plated steel sheet 1 according to the present embodiment obtained by the above-described findings includes, as shown in FIG. 1-1 and FIG. 1-2, a base steel sheet 11 and a Ni plating layer 12 provided on a surface of the base steel sheet, and the ratio of the Zn content to the Ni content in the Ni plating layer 12 is 0.0005% to 0.10%. Hereinafter, the Ni-plated steel sheet 1 according to the present embodiment will be described in detail.

Base Steel Sheet 11

The base steel sheet 11 is a steel sheet that serves as a substrate of the Ni-plated steel sheet 1. The components, sheet thickness, metallographic structure, and the like of the base steel sheet 11 are not particularly limited. In a case where the base steel sheet 11 is used as a material of a battery container, for example, the base steel sheet 11 is preferably made of low-carbon aluminum killed steel, IF steel (interstitial free steel/ultra-low carbon steel), or the like. Specific examples of the chemical composition (mass %) of the base steel sheet 11 are as described below.

(Example 1) Low-Carbon Aluminum Killed Steel

C: 0.057%, Si: 0.004%, Mn: 0.29%, P: 0.014%, S: 0.007%, Al: 0.050%, Cu: 0.034%, Ni: 0.021%, remainder: including iron and an impurity (Example 2) IF Steel C: 0.004%, Si: 0.01%, Mn: 0.16%, P: 0.013%, S: 0.006%, Al: 0.029%, Cu: 0.027%, Ni: 0.022%, Ti: 0.013%, remainder: including iron and an impurity (Example 3) IF Steel C: 0.0012%, Si: less than 0.01%, Mn: 0.16%, P: 0.013%, S: 0.006%, Al: 0.029%, Cu: 0.027%, Ni: 0.022%, Ti: 0.020%, remainder: including iron and an impurity The thickness of the base steel sheet 11 is also not particularly limited. In a case where the Ni-plated steel sheet 1 is used as, for example, a material of a battery container, the thickness of the base steel sheet 11 is preferably set to, for example, 0.15 mm to 0.8 mm.

Ni Plating Layer 12

The Ni plating layer 12 is formed on a surface of the base steel sheet 11. The Ni plating layer 12 may be disposed only on one surface of the base steel sheet 11 or may be disposed on both surfaces.

The Ni plating layer 12 includes a Ni—Fe alloy layer 122. The Ni—Fe alloy layer 122 may be formed on a part of the Ni plating layer 12 or may be formed up to the outermost surface of the Ni plating layer 12. The fact that the Ni—Fe alloy layer 122 is formed on a part of the Ni plating layer 12 is also referred to as partial diffusion, and the fact that the Ni—Fe alloy layer 122 is formed up to the outermost surface of the Ni plating layer 12 is also referred to as total diffusion.

The upper parts of FIG. 1-1 and FIG. 1-2 are conceptual diagrams of a cross section of the Ni-plated steel sheet 1. The lower parts of FIG. 1-1 and FIG. 1-2 are graphs showing the relationships between the Zn strength, the Ni strength, and the Fe strength and the distance in the depth direction from the outermost surface in the case of performing glow discharge spectroscopy (GDS) from the surface of the Ni-plated steel sheet 1 toward the inside. In the present embodiment, a region from the outermost surface of the Ni plating layer 12 to a position where the Fe strength becomes $1/10$ of the Fe strength (maximum Fe strength) of the base metal is defined as a Ni layer 121. In addition, a region from the position where the Fe strength becomes $1/10$ of the maximum Fe strength to a position where the Ni strength becomes $1/10$ of the maximum value of the Ni strength (maximum Ni strength) of the Ni plating layer 12 is defined as the Ni—Fe alloy layer 122.

In a case where the diffusion of Fe does not reach the outermost surface of the Ni plating layer 12, the GDS result becomes as shown in FIG. 1-1, and the Ni plating layer 12 becomes a partial diffusion layer including the Ni layer 121 and the Ni—Fe alloy layer 122. In a case where Fe sufficiently diffuses up to the outermost surface of the Ni plating layer 12, the GDS result becomes as shown in FIG. 1-2, and the Ni plating layer 12 becomes a total diffusion layer not including the Ni layer 121. The Ni plating layer 12 of the Ni-plated steel sheet 1 according to the present embodiment may have any form. The Ni-plated steel sheet 1 may include both a partial diffusion layer and a total diffusion layer.

Determination of whether the Ni plating layer 12 is total diffusion or partial diffusion is determined from element distribution in the depth direction obtained by GDS. GDS measurement conditions are as described below.

Anode diameter: φ4 mm
Gas: Ar
Gas pressure: 600 Pa
Output: 35 W

The Ni plating layer where the Fe strength on the outermost surface is more than $1/10$ of the maximum Fe strength is regarded as total diffusion, and the Ni plating layer where the Fe strength is $1/10$ or less is regarded as partial diffusion. (Refer to FIG. 1-1 and FIG. 1-2)

The Ni plating layer 12 contains a small amount of Zn. The ratio of the Zn content to the Ni content (that is, a value obtained by dividing the Zn content by the Ni content) in the Ni plating layer 12 is within a range of 0.0005% to 0.10%. Here, the "Ni content" and the "Zn content" each mean the Ni coating weight and the Zn coating weight. Therefore, the ratio of the Zn content to the Ni content is the average value throughout the entire Ni plating layer 12.

When the ratio of the Zn content to the Ni content is set to 0.0005% or more, the corrosion resistance of the Ni-plated steel sheet 1 is dramatically improved. On the other hand, when the amount of Zn is excessive, Zn is likely to be eluted, and the electrolytic solution resistance is impaired. Therefore, the ratio of the Zn content to the Ni content is set to 0.10% or less. The ratio of the Zn content to the Ni content may be set to 0.010% or more, 0.015% or more, or 0.020% or more. The ratio of the Zn content to the Ni content may be set to 0.020% or less, 0.019% or less, or 0.018% or less.

At the moment, the reason for a small amount of Zn contained in the Ni plating layer 12 to improve the corrosion resistance of the Ni-plated steel sheet 1 is not clear. There is a possibility that the sacrificial protection effect of Zn may be exhibited. On the other hand, the Zn content in the Ni-plated steel sheet 1 according to the present embodiment is far lower than an amount at which the sacrificial protection effect can be expected. Therefore, there is another possibility that a mechanism different from that of sacrificial protection may work.

The ratio of the Zn content to the Ni content in the Ni plating layer 12 is measured by dividing the Zn coating weight by the Ni coating weight. The Ni coating weight in the Ni plating layer 12 is measured by ICP optical emission spectroscopy (ICP-OES). First, a predetermined area of the Ni plating layer 12 is dissolved in an acid. Next, the amount of Ni contained in the solution is quantitatively analyzed by ICP-OES. The amount of Ni quantified by ICP-OES is divided by the above-described predetermined area, whereby the Ni coating weight per unit area can be obtained. In addition, the Zn coating weight in the Ni plating layer 12 is measured by ICP mass spectrometry (ICP-MS). A predetermined area of the Ni plating layer 12 is dissolved in an acid. Zn contained in the solution is quantitatively analyzed by ICP-MS. The amount of Zn quantified by ICP-MS is divided by the above-described predetermined area, whereby the Zn coating weight per unit area can be obtained.

As long as the ratio of the Zn content to the Ni content is within the above-described range, the average composition, thickness, and the like of the Ni plating layer 12 are not particularly limited and can be appropriately set depending on the application of the Ni-plated steel sheet 1. The Ni plating layer 12 may contain an impurity to an extent that the characteristics are not impaired.

For example, the Ni coating weight per one surface of the Ni plating layer 12 may be set to 2.7 to 32.8 g/m$^2$. When the Ni coating weight in the Ni plating layer 12 is set to 2.7 g/m$^2$ or more, it is possible to reliably ensure the corrosion resistance of the Ni-plated steel sheet 1, which is preferable. When the Ni coating weight in the Ni plating layer 12 is set to 32.8 g/m$^2$ or less, it is possible to reduce the manufacturing cost of the Ni-plated steel sheet 1, which is preferable. In addition, when the Ni coating weight per one surface is more than 32.8 g/m$^2$, the hardness of the Ni plating layer 12 becomes excessive, and the workability is impaired. Furthermore, in this case, there is a case where cracks are induced in the Ni plating layer 12 due to internal stress. In addition, in a case where the Ni plating layer 12 is formed as a partial diffusion layer, the Ni coating weight per one surface of the Ni-plated steel sheet 1 is preferably set to 2.7 to 3.8 g/m$^2$. In a case where the Ni plating layer 12 is formed as a total diffusion layer, the Ni coating weight per one surface of the Ni-plated steel sheet 1 is preferably set to 3.8 to 32.8 g/m$^2$. In addition, the thickness of the Ni plating layer 12 is, for example, 0.1 to 10.0 μm.

Next, a preferable manufacturing method of the Ni-plated steel sheet 1 according to the present embodiment will be described. However, Ni-plated steel sheets having the above-described requirements are regarded as the Ni-plated steel sheet 1 according to the present embodiment regardless of manufacturing methods thereof.

The manufacturing method of the Ni-plated steel sheet 1 according to the present embodiment includes electroplating S1 a base steel sheet using a Ni plating bath in which $[Zn^{2+}]/[Ni^{2+}]$ is set to 0.0005% to 0.10% to obtain a material Ni-plated steel sheet, and annealing S2 the material Ni-plated steel sheet.

In the electroplating S1, Ni plating is performed on the base steel sheet 11 to obtain a material Ni-plated steel sheet. In the present embodiment, the unalloyed Ni-plated steel sheet that is obtained after the Ni plating will be referred to as the material Ni-plated steel sheet. In the Ni plating bath that is used for the electroplating, $[Zn^{2+}]/[Ni^{2+}]$ is set to 0.0005% to 0.10%. $[Zn^{2+}]$ is the concentration (g/L) of Zn that is contained in the Ni plating bath in a $Zn^{2+}$ form, and $[Ni^{2+}]$ is the concentration (g/L) of Ni that is contained in the Ni plating bath in a $Ni^{2+}$ form. When $[Zn^{2+}]/[Ni^{2+}]$ is set within a range of 0.0005% to 0.10%, it is possible to set the ratio of the Zn content to the Ni content in the Ni plating within a range of 0.0005% to 0.10%. In addition, this proportion is maintained even after the annealing S2 is subsequently performed.

As long as $[Zn^{2+}]/[Ni^{2+}]$ is set within the above-described range, the composition of the Ni plating bath is not particularly limited. In addition, electroplating conditions are not particularly limited and can be appropriately selected depending on a required Ni coating weight. The Ni coating weight of the material Ni-plated steel sheet is preferably set to 2.7 to 32.8 g/m$^2$ per one surface. In such a case, it is possible to set the Ni coating weight per one surface of the Ni-plated steel sheet 1 that is obtained after the annealing S2 to 2.7 to 32.8 g/m$^2$. A preferable Ni coating weight per one surface of the material Ni-plated steel sheet is based on the above-described preferable Ni coating weight per one surface of the Ni-plated steel sheet 1. The current density is preferably set within a range of 100 to 5000 A/m$^2$. When the current density is set to 100 A/m$^2$ or more, a preferable Ni coating weight can be set. When the current density is set to 5000 A/m$^2$ or less, it is possible to prevent plated surface burn or the like.

In the subsequent annealing S2, the material Ni-plated steel sheet is annealed, and the Ni plating is alloyed. This causes interdiffusion of Ni and Fe between the Ni plating and the base steel sheet 11 and forms the Ni plating layer 12. Annealing conditions are not particularly limited and can be appropriately selected depending on the film thickness of the Ni plating. Examples thereof include a heat pattern in which the material Ni-plated steel sheet is heated from 25° C. to 720° C. at an average temperature increase velocity of 20° C./sec in $N_2$-4% $H_2$, held at 720° C. for 20 seconds, and then cooled to 300° C. at an average cooling rate of 30° C./sec, in order for additional promotion of diffusion, a heat pattern in which the material Ni-plated steel sheet is heated from 25° C. to 830° C. at an average temperature increase velocity of 15° C./sec in $N_2$-4% $H_2$, held at 830° C. for 60 seconds, and then cooled to 300° C. at an average cooling rate of 20° C./sec, and the like.

As described above, the Ni-plated steel sheet in the present embodiment satisfies both corrosion resistance and electrolytic solution resistance by adding a small amount of Zn to the Ni plating layer.

Means for adding a small amount of Zn to the Ni plating layer is not limited to the above-described means, but it is not preferable to add Zn to the Ni plating layer by thermal diffusion. This is because, for example, in a case where a Zn base material plating is formed on a base steel sheet, a Ni plating is formed thereon, and these two platings are thermally diffused, there is a concern that the Zn plating, which is the base material, may be melted and evaporated due to heat and peeling or the like of the plating may be caused. This fact can be easily presumed by those skilled in the art who know the characteristics of the Zn plating.

The Ni-plated steel sheet in the present embodiment is suitable as a material for which not only electrolytic solution resistance but also corrosion resistance are required. For example, the Ni-plated steel sheet can be suitably used as a battery can that is exposed to a severe corrosive environment such as the inner surface environment of a primary battery or a secondary battery or as a fuel pipe through which fuel passes.

Examples

Relationship Between Zn Concentration in Ni Plating Layer and Corrosion Resistance and Electrolytic Solution Resistance of Ni-Plated Steel Sheet A plurality of Ni-plated steel sheets were manufactured using base steel sheets (Table 4) with a variety of Ni plating bath compositions (Table 1), Ni electrolysis conditions (Table 2), and annealing conditions (Table 3), and the corrosion resistance and electrolytic solution resistance thereof were evaluated. The units of the chemical components shown in Table 4 are "mass %". As $NiSO_4 \cdot 6H_2O$, $NiSO_4 \cdot 6H_2O$ having a purity of 99.9% was used. As $H_2SO_4$, $H_2SO_4$ having a concentration of 95.0% was used. As boric acid, boric acid having a purity of 97.0% was used. As $ZnSO_4$, $ZnSO_4$ having a purity of 99.9% was used.

TABLE 3

| Annealing condition | Atmosphere in furnace | Average temperature increase velocity (25° C. to soaking temperature) | Soaking temperature | Soaking time | Average cooling rate (soaking temperature to 300° C.) |
|---|---|---|---|---|---|
| Annealing condition 1 | $N_2$—4% $H_2$ | 20° C./sec | 720° C. | 20 sec | 30° C./sec |
| Annealing condition 2 | $N_2$—4% $H_2$ | 15° C./sec | 830° C. | 60 sec | 20° C./sec |

TABLE 4

| Steel type | Components |
|---|---|
| Low-carbon aluminum killed steel (Al—K) | C: 0.057, Si: 0.004, Mn: 0.29, P: 0.014, S: 0.007, remainder: including iron and impurity |
| IF steel (IF) | C: 0.0012, Si: less than 0.01, Mn: 0.29, P: 0.014, S: less than 0.001, remainder: including iron and impurity |

TABLE 1

| Bath No. | Bath composition g/L | | | | Metal ion concentration in plating solution | | |
|---|---|---|---|---|---|---|---|
| | $NiSO_4 \cdot 6H_2O$ | $H_2SO_4$ | Boric acid | $ZnSO_4$ | $Ni^{2+}$ (g/L) | $Zn^{2+}$ (g/L) | $[Zn^{2+}]/[Ni^{2+}]$ (%) |
| A bath | 230 | 0.5 | 45 | 0.0000 | 51.4 | 0.0000 | 0.0000 |
| B bath | 230 | 0.5 | 45 | 0.0001 | 51.4 | 0.0001 | 0.0002 |
| C bath | 230 | 0.5 | 45 | 0.0004 | 51.4 | 0.0003 | 0.0006 |
| D bath | 230 | 0.5 | 45 | 0.0008 | 51.4 | 0.0005 | 0.001 |
| E bath | 230 | 0.5 | 45 | 0.004 | 51.4 | 0.0026 | 0.005 |
| F bath | 230 | 0.5 | 45 | 0.008 | 51.4 | 0.005 | 0.010 |
| G bath | 230 | 0.5 | 45 | 0.014 | 51.4 | 0.0086 | 0.017 |
| H bath | 230 | 0.5 | 45 | 0.016 | 51.4 | 0.0099 | 0.020 |
| I bath | 230 | 0.5 | 45 | 0.024 | 51.4 | 0.0151 | 0.03 |
| J bath | 230 | 0.5 | 45 | 0.032 | 51.4 | 0.0202 | 0.04 |
| K bath | 230 | 0.5 | 45 | 0.08 | 51.4 | 0.05 | 0.1 |
| L bath | 230 | 0.5 | 45 | 0.128 | 51.4 | 0.0791 | 0.15 |
| M bath | 230 | 0.5 | 45 | 0.16 | 51.4 | 0.1009 | 0.2 |
| N bath | 230 | 0.5 | 45 | 0.24 | 51.4 | 0.1502 | 0.3 |
| O bath | 230 | 0.5 | 45 | 0.32 | 51.4 | 0.1992 | 0.4 |
| P bath | 230 | 0.5 | 45 | 0.4 | 51.4 | 0.2456 | 0.5 |
| Q bath | 230 | 0.5 | 45 | 0.8 | 51.4 | 0.5024 | 1 |

TABLE 2

| Electrolysis condition | Current density (A/m²) | Total energization amount (C/m²) |
|---|---|---|
| Electrolysis condition 1 | 100 | 10000 |
| Electrolysis condition 2 | 1000 | 10000 |
| Electrolysis condition 3 | 5000 | 10000 |
| Electrolysis condition 4 | 1000 | 30000 |
| Electrolysis condition 5 | 1000 | 60000 |
| Electrolysis condition 6 | 1000 | 90000 |
| Electrolysis condition 7 | 100 | 120000 |
| Electrolysis condition 8 | 1000 | 120000 |
| Electrolysis condition 9 | 5000 | 120000 |

The ratio of the Zn content to the Ni content in the Ni plating layer of each sample was obtained by dividing the Zn coating weight by the Ni coating weight. A predetermined amount of the Ni plating layer in each sample was dissolved in an acid, the amount of Ni in the solution was measured by ICP-OES, and the amount of Zn was measured by ICP-MS.

Determination of whether the Ni plating layer in each sample was total diffusion or partial diffusion was determined from element distribution in the depth direction obtained by glow discharge spectroscopy (GDS). A high-frequency glow discharge optical emission surface analyzer (manufactured by Horiba, Ltd., Model No.: GD-Profiler 2) was used for the measurement. GDS measurement conditions were as described below.
Anode diameter: φ4 mm
Gas: Ar
Gas pressure: 600 Pa
Output: 35 W
The Ni plating layer where the Fe strength on the outermost surface was more than 1/10 of the maximum Fe strength was regarded as total diffusion, and the Ni plating layer where the Fe strength was 1/10 or less was regarded as partial diffusion (refer to FIG. 1-1 and FIG. 1-2).

The corrosion resistance was evaluated by performing a neutral salt spray test according to JIS Z 2371: 2015 "Methods of salt spray testing". In the evaluation, STP-200Z (manufactured by Suga Test Instruments Co., Ltd.) was used as a device. The corrosion resistance was evaluated by an 8-hour salt spray test. End portions of a test piece were all sealed using pressure-sensitive adhesive tape. A test piece in which the area ratio of red rust generation was 20% or less was determined as a Ni-plated steel sheet having excellent corrosion resistance. Specifically, when the area ratio of red rust generation was 20% or less, the corrosion resistance was evaluated as A, and, when the area ratio was more than 20%, the corrosion resistance was evaluated as B.

The electrolytic solution resistance was evaluated by electrochemical measurement in KOH. Specific evaluation conditions were as described below.

Evaluation area: 1 cm$^2$
Counter electrode: Pt line
Test solution: 35% KOH

Under the above-described conditions, anodic polarization was performed at 20 mV/min from the natural potential to 0.7 V vs. Hg/HgO, and the anode current was measured at 0.3 V vs. Hg/HgO (the potential of $MnO_2$, which is an active material of a battery). A test piece in which the anode current density was $10.0 \times 10^{-6}$ A/cm$^2$ or more was determined as a Ni-plated steel sheet having excellent electrolytic solution resistance. Specifically, when the anode current density was less than $10.0 \times 10^{-6}$ A/cm$^2$, the electrolytic solution resistance was evaluated as A, and, when the anode current density was $10.0 \times 10^{-6}$ A/cm$^2$ or more, the electrolytic solution resistance was evaluated as B.

TABLE 6

| Level | Red rust area ratio after 8-hour salt spray test (%) | | Anode current density (×10$^{-6}$ A·cm$^{-2}$) | | Note |
|---|---|---|---|---|---|
| 1 | 35 | B | 1.3 | A | Comparative Example |
| 2 | 28 | B | 2.2 | A | Comparative Example |
| 3 | 18 | A | 2.1 | A | Example |
| 4 | 18 | A | 1.9 | A | Example |
| 5 | 17 | A | 2.1 | A | Example |
| 6 | 15 | A | 3.9 | A | Example |
| 7 | 14 | A | 3.9 | A | Example |
| 8 | 14 | A | 3.8 | A | Example |
| 9 | 15 | A | 5.2 | A | Example |
| 10 | 15 | A | 6.3 | A | Example |
| 11 | 13 | A | 9.2 | A | Example |
| 12 | 13 | A | 11.2 | B | Comparative Example |
| 13 | 12 | A | 13.8 | B | Comparative Example |
| 14 | 11 | A | 15.7 | B | Comparative Example |
| 15 | 12 | A | 15.4 | B | Comparative Example |
| 16 | 12 | A | 16.7 | B | Comparative Example |
| 17 | 10 | A | 18.2 | B | Comparative Example |
| 18 | 14 | A | 5.9 | A | Example |
| 19 | 14 | A | 5.6 | A | Example |
| 20 | 14 | A | 4.9 | A | Example |
| 21 | 13 | A | 5.1 | A | Example |
| 22 | 14 | A | 4.7 | A | Example |
| 23 | 14 | A | 4.2 | A | Example |
| 24 | 14 | A | 5.1 | A | Example |
| 25 | 14 | A | 4.8 | A | Example |
| 26 | 15 | A | 4.7 | A | Example |
| 27 | 17 | A | 5.1 | A | Example |

Table 5 and Table 6 show the ratio of the Zn content to the Ni content in the Ni plating layer, the corrosion resistance, and the electrolytic solution resistance of each sample. At levels 3 to 11 and 18 to 27, a small amount of Zn was contained in the Ni plating layer, and the corrosion resistance was dramatically enhanced more than normal Ni-

TABLE 5

| Level | Steel type | Bath No. | Ni electrolysis condition | Annealing condition | Ni coating weight (g/m$^2$) | Ratio of Zn content to Ni content in Ni plating layer (%) | Total diffusion/partial diffusion |
|---|---|---|---|---|---|---|---|
| 1 | Al-k | A bath | Condition 5 | Condition 1 | 16.4 | 0 | Partial diffusion |
| 2 | Al-k | B bath | Condition 5 | Condition 1 | 16.6 | 0.0002 | Partial diffusion |
| 3 | Al-k | C bath | Condition 5 | Condition 1 | 16.4 | 0.0006 | Partial diffusion |
| 4 | Al-k | D bath | Condition 5 | Condition 1 | 16.7 | 0.001 | Partial diffusion |
| 5 | Al-k | E bath | Condition 5 | Condition 1 | 16.5 | 0.005 | Partial diffusion |
| 6 | Al-k | F bath | Condition 5 | Condition 1 | 16.6 | 0.010 | Partial diffusion |
| 7 | Al-k | G bath | Condition 5 | Condition 1 | 16.5 | 0.019 | Partial diffusion |
| 8 | Al-k | H bath | Condition 5 | Condition 1 | 16.3 | 0.022 | Partial diffusion |
| 9 | Al-k | I bath | Condition 5 | Condition 1 | 16.4 | 0.031 | Partial diffusion |
| 10 | Al-k | J bath | Condition 5 | Condition 1 | 16.5 | 0.041 | Partial diffusion |
| 11 | Al-k | K bath | Condition 5 | Condition 1 | 16.3 | 0.100 | Partial diffusion |
| 12 | Al-k | L bath | Condition 5 | Condition 1 | 16.4 | 0.152 | Partial diffusion |
| 13 | Al-k | M bath | Condition 5 | Condition 1 | 16.1 | 0.208 | Partial diffusion |
| 14 | Al-k | N bath | Condition 5 | Condition 1 | 16.3 | 0.305 | Partial diffusion |
| 15 | Al-k | O bath | Condition 5 | Condition 1 | 16.5 | 0.412 | Partial diffusion |
| 16 | Al-k | P bath | Condition 5 | Condition 1 | 16.4 | 0.512 | Partial diffusion |
| 17 | Al-k | Q bath | Condition 5 | Condition 1 | 16.3 | 1.024 | Partial diffusion |
| 18 | Al-k | H bath | Condition 1 | Condition 1 | 2.7 | 0.078 | Total diffusion |
| 19 | Al-k | H bath | Condition 2 | Condition 1 | 2.7 | 0.074 | Total diffusion |
| 20 | Al-k | H bath | Condition 3 | Condition 1 | 2.7 | 0.067 | Total diffusion |
| 21 | Al-k | H bath | Condition 4 | Condition 1 | 8.0 | 0.038 | Partial diffusion |
| 22 | Al-k | H bath | Condition 6 | Condition 1 | 24.7 | 0.016 | Partial diffusion |
| 23 | Al-k | H bath | Condition 7 | Condition 1 | 32.8 | 0.013 | Partial diffusion |
| 24 | Al-k | H bath | Condition 8 | Condition 1 | 32.5 | 0.012 | Partial diffusion |
| 25 | Al-k | H bath | Condition 9 | Condition 1 | 31.9 | 0.011 | Partial diffusion |
| 26 | IF | H bath | Condition 5 | Condition 1 | 16.2 | 0.022 | Partial diffusion |
| 27 | IF | H bath | Condition 5 | Condition 2 | 16.3 | 0.021 | Partial diffusion | plated steel sheets. Furthermore, the electrolytic solution resistance was at the same level as that of normal Ni-plated steel sheets.

A level 1 was a normal Ni-plated steel sheet containing no Zn. Therefore, the electrolytic solution resistance was excellent, but the corrosion resistance was insufficient. At a level 2, the ratio of the Zn content to the Ni content in the Ni plating layer was small, and the corrosion resistance was insufficient. At levels 12 to 17, the ratio of the Zn content to the Ni content in the Ni plating layer was large, and the corrosion resistance was enhanced more than those of normal Ni-plated steel sheets, but the electrolytic solution resistance was insufficient.

Industrial Applicability

The present invention can be used for battery cans or fuel pipes for which not only electrolytic solution resistance but also corrosion resistance are required. The present invention is capable of providing a Ni-plated steel sheet being capable of suppressing metal elution in a severe corrosive environment, for example, an inner surface environment of a primary battery or a secondary battery and being excellent in terms of favorable corrosion resistance and a manufacturing method thereof and is thus extremely industrially applicable.

Brief Description of the Reference Symbols

1 Ni-plated steel sheet
11 Base steel sheet
12 Ni plating layer
121 Ni layer
122 Ni—Fe alloy layer

The invention claimed is:

1. A Ni-plated steel sheet comprising:
a base steel sheet; and
a Ni plating layer provided on a surface of the base steel sheet,
wherein the Ni plating layer includes a Ni—Fe alloy layer formed on the surface of the base steel sheet, and
a weight ratio of Zn content to Ni content in the Ni plating layer is 0.0005% to 0.078%.

2. The Ni-plated steel sheet according to claim 1, wherein the Ni—Fe alloy layer is formed in a part of the Ni plating layer.

3. The Ni-plated steel sheet according to claim 1, wherein the Ni—Fe alloy layer is formed up to an outermost surface of the Ni plating layer.

4. A Ni-plated steel sheet comprising:
a base steel sheet; and
a Ni plating layer provided on a surface of the base steel sheet,
wherein the Ni plating layer includes a Ni—Fe alloy layer formed on the surface of the base steel sheet, and
a weight ratio of a Zn content to a Ni content in the Ni plating layer is 0.0005% to 0.10%,
wherein a Ni coating weight per one surface is 2.7 to 32.8 g/m$^2$.

5. A manufacturing method of the Ni-plated steel sheet according to claim 1, comprising:
electroplating a base steel sheet using a Ni plating bath in which $[Zn^{2+}]/[Ni^{2+}]$ is set to 0.0005% to 0.078% by weight to obtain a material Ni-plated steel sheet; and
annealing the material Ni-plated steel sheet.

6. The manufacturing method of the Ni-plated steel sheet according to claim 5,
wherein a current density in the electroplating is set to 100 to 5000 A/m$^2$.

7. A manufacturing method of a Ni-plated steel sheet, comprising:
electroplating a base steel sheet using a Ni plating bath in which $[Zn^{2+}]/[Ni^{2+}]$ is set to 0.0005% to 0.10% by weight to obtain a material Ni-plated steel sheet; and
annealing the material Ni-plated steel sheet,
wherein a Ni coating weight per one surface in the material Ni-plated steel sheet is set to 2.7 to 32.8 g/m$^2$.

8. The Ni-plated steel sheet according to claim 1, wherein the Ni-plated steel sheet consists of the base steel sheet and the Ni plating layer.

* * * * *